Patented Feb. 4, 1947

2,415,373

UNITED STATES PATENT OFFICE 2,415,373

SUBSTITUTED 4-HYDROXYALKYLAMINO-1,8-NAPHTHALIC ACID IMIDES

Mario Scalera, Somerville, and Asa Willard Joyce, Plainfield, N. J., assignors to American Cyanamid Company, New York, N. Y., a corporation of Maine No Drawing. Application September 5, 1942, Serial No. 457,518

5 Claims. (Cl. 260—281)

This invention relates to certain new 4-amino-1,8-naphthalimides.

The compounds of the present invention correspond to the following formula:

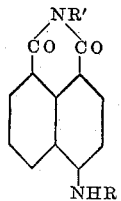

in which R is a hydroxyalkyl radical and R' is a saturated hydrocarbon radical. The compounds are yellow dyestuffs which have a strong fluorescense under ultraviolet light. The dyestuffs may be used for dyeing various plastics and certain of the dyestuffs, particularly those in which R is hydroxyalkyl radical of 2 or 3 carbon atoms and R' is a lower alkyl radical having from 1 to 5 carbon atoms, show excellent affinity to cellulose acetate and may be used in dyeing cellulose acetate plastics or fabrics made from cellulose acetate fibers. These dyestuffs are also useful in dyeing fibers and fabrics of the super polyamide type such as the various grades of "nylon." In addition to the dyeing of cellulose acetate and super polyamides referred to above, excellent results are obtained in dyeing plastics, particularly plastics which produce transparent or translucent products such as methacrylates, polystyrene, aminoplasts of the urea or triazine aldehyde type and the like. The yellow colors which are imparted to plastics and certain synthetic fibers by dyestuffs of the present invention are very brilliant, being golden yellow by transmitted light and greenish yellow by reflected light and fluorescing strongly in the green under ultraviolet light. They are useful for various purposes including objects which must show strong fluorescence for use in blackouts, displays for theatrical performances and the like.

While the present invention is not limited to any particular process of preparing the compounds, a very satisfactory process consists in first reacting a 4-halogen naphthalic anhydride with the desired saturated amine to produce the corresponding imide, and then reacting the halogenated imide with the desired alkylolamine. The reactivity of the anhydride group with amines is much greater than that of the halogen group, and therefore if the first step of the process is carried out in an inert diluent, and the amine is present in theoretical amounts, or at least without any considerable excess, the reaction takes place practically exclusively with the anhydride group. The alkylolamine reaction then takes place by heating with the alkylolamine in considerable excess, or by heating with a theoretical amount of alkylolamine in an inert diluent. In the latter case the heating should take place in the presence of a cupriferous catalyst and preferably of a substance capable of uniting with the hydrogen halide set free. When the second step is carried out in the same inert diluent it becomes unnecessary to isolate the halogenated imide.

While either the 4-bromo-naphthalic anhydride or the 4-chloro compound may be used as starting materials, the bromo compound is more reactive and hence in most cases preferable.

The first step of the process is not critical as to temperature because of the much greater reactivity of the anhydride group. In the second step temperatures of 130–150° C. are suitable when the reaction is carried out with an excess of amine and without diluent and catalyst. If carried out in an inert diluent such as for example dichlorobenzene, temperatures are preferably 150–180° C. and a cupriferous catalyst and an acid binder are used. The cupriferous catalyst is not critical and the ordinary types of catalysts such as copper powder, cupric chloride, cuprous chloride, cuprous iodide or mixtures of copper powder with iodine may be employed. The acid binding material may be of any suitable type, alkali metal carbonates and acetates giving excellent results.

The preferred imides are those containing lower alkyl groups, particularly butyl or amyl imides. The particular isomeric amine is not important and any of the isomeric primary butyl or amylamines may be used or, if desired, mixtures of isomers may be employed. This is an advantage as mixed isomeric amines are frequently cheaper than pure isomers themselves.

The primary alkylolamine may be any of the ordinary primary alkylol amines. The most valuable products are obtained from β-hydroxyethylamine or β-hydroxypropylamine.

The invention will be described in greater detail in conjunction with the following typical examples. The parts are by weight.

*Example 1*

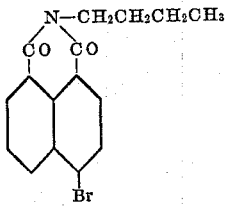

55.4 parts 4-bromo-1,8-naphthalic anhydride (M. P. 218–19° C.) are introduced into 455 parts o-dichlorobenzene; the mixture is stirred and heated to 135–140° C. 16.0 parts n-butylamine are now added gradually over the course of 2 hours. After heating an hour longer water and excess butylamine are removed by gradually raising the temperature of the reaction mixture to 160–165° C. The charge is cooled to 100° C. and 2.0 parts sodium carbonate are added, whereupon the mixture is steamed to remove dichlorobenzene. On cooling, the crude 4-bromo-1,8-naphthalic acid n-butylimide crystallizes as a pale yellow substance, which after recrystallization from alcohol shows a melting point of 104–105° C.

*Example 2*

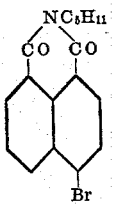

100 parts 4-bromo-1,8-naphthalic anhydride (melting point 218–19° C.) are introduced into 260 parts o-dichlorobenzenes; the charge is stirred, and heated to 135–40° C. Then 40 parts commercial amylamine are added gradually during the course of 2 hours, water and excess amylamine refluxing. After heating for 2–3 hours longer at 135–140° C. the water and excess amylamine are removed by distilling and raising the temperature of the reaction mixture to 160–165° C. On cooling to room temperature there is no separation of the reaction product. To isolate it o-dichloro-benzene is removed by steaming. A viscous yellow liquid remains which solidifies on cooling. The yield is nearly theoretical. On recrystallization from alcohol the 4-bromo-1,8-naphthalic acid N-amylimide is obtained in pale yellow crystals melting at 73–75° C.

*Example 3*

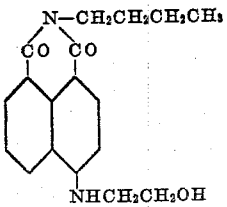

33.2 parts 4-bromo-1,8-naphthalic acid n-butylimide and 18.3 parts monoethanol amine are stirred and heated at 135–140° C. for 4 hours. A homogeneous deep brownish-yellow mass is formed. 180 parts monochlorobenzene are now introduced and the mixture heated to boiling until solution results. On cooling a mass of yellow crystals separates which is filtered off and washed with water. The yellow 4-ethanolamino-1,8-naphthalic acid n-butylamide may be recrystallized from monochlorobenzene and melts at 168–169° C. It is readily soluble in alcohol and acetone, sparingly soluble in monochlorobenzene and insoluble in hexane. It is readily dispersed in dilute soap solutions from which it colors Celanese a strong greenish-yellow shade exhibiting an intense fluorescence, especially under the ultra-violet lamp.

*Example 4*

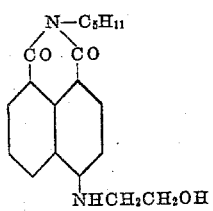

The procedure of Example 3 is followed but instead of using 4-bromo-1,8-naphthalic acid n-butylimide corresponding amounts of 4-bromo-1,8-naphthalic acid amylimide are used, prepared as described in Example 2. The reaction proceeds in the same manner and a fluorescent yellow dye can be obtained which dyes plastics a greenish-yellow shade and exhibits intense fluorescence under the ultraviolet lamp.

*Example 5*

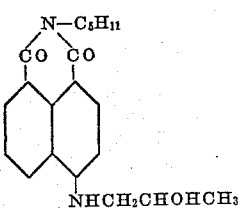

4-bromo-1,8-naphthalic acid amylamide prepared as described in Example 2 is reacted with β-hydroxypropylamine, the procedure of Example 3 being followed using corresponding weights of the hydroxy propylamine for the monoethanolamine. A yellow dye is obtained which dyes plastics a greenish-yellow shade and fluoresces strongly under ultraviolet light.

*Example 6*

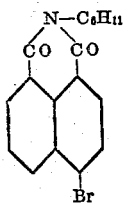

27.7 parts 4-bromo-1,8-naphthalic anhydride and 11.0 parts cyclohexyamine are introduced into 75 parts n-butanol and the mixture is stirred and heated at reflux temperature for 3 hours. The resulting clear solution is then steamed to remove butanol, and the crude reaction product filtered and washed. The imide obtained in nearly theoretical yield melts at 223–225° C. and is sparingly soluble in benzene and monochlorobenzene and readily soluble in butanol and hot glacial acetic acid.

Example 7

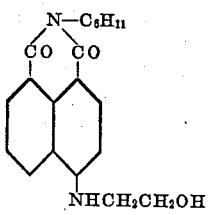

35.8 parts of 4-bromo-1,8-naphthalic acid cyclohexylimide and 18.3 parts of monoethanolamine are stirred and heated at about 135–240° C. for several hours. After the reaction is complete 108 parts of monochlorobenzene is introduced and the mixture heated to boiling until a solution results. On cooling yellow crystals separate out which are washed with water. These crystals constitute a yellow dye which dyes plastics a greenish-yellow shade and fluoresces strongly under ultraviolet light.

We claim:

1. New compounds having the following general formula:

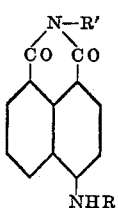

in which R is an akylol group having less than four carbon atoms and R' is a radical of a saturated hydrocarbon of less than seven carbon atoms.

2. New compounds having the following general formula:

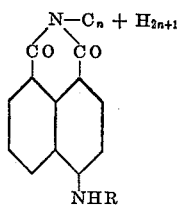

where R is an alkylol group having less than four carbon atoms and $n$ is an integer selected from the group consisting of 2 and 3.

3. A 4-β-hydroxyethylamine - 1,8-naphthalic acid butylimide having the following formula:

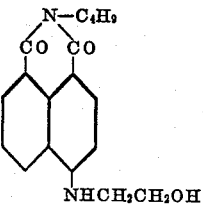

4. A 4-β-hydroxyethylamine-1,8 - naphthalic acid amylimide having the following formula:

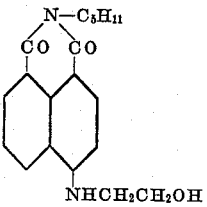

5. A 4-β-hydroxyethylamine - 1,8 - naphthalic acid $n$-butylimide having the following formula:

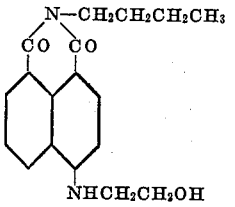

MARIO SCALERA.
ASA WILLARD JOYCE.

REFERENCES CITED

The following references are of record in the file of this patent:

UNITED STATES PATENTS

| Number | Name | Date |
|---|---|---|
| 1,796,011 | Eckert | Mar. 10, 1931 |
| 1,796,012 | Eckert | Mar. 10, 1931 |
| 1,984,110 | Bodmer | Dec. 11, 1934 |
| 2,006,017 | Eckert | June 25, 1935 |
| 1,836,529 | Eckert | Dec. 15, 1931 |
| 1,886,797 | Eckert | Nov. 8, 1932 |
| 1,918,461 | Eckert | July 18, 1933 |
| 2,096,295 | Eckert | Oct. 19, 1937 |